US 8,036,870 B2

(12) United States Patent
Dierickx et al.

(10) Patent No.: US 8,036,870 B2
(45) Date of Patent: Oct. 11, 2011

(54) SIMULATION METHOD FOR EFFICIENT CHARACTERIZATION OF ELECTRONIC SYSTEMS UNDER VARIABILITY EFFECTS (75) Inventors: Bart Dierickx, Edegem (BE); Miguel Miranda, Kessel-Lo (BE)

(73) Assignee: IMEC, Leuven (BE)

( * ) Notice: Subject to any disclaimer, the term of this patent is extended or adjusted under 35 U.S.C. 154(b) by 455 days.

(21) Appl. No.: 12/144,524

(22) Filed: Jun. 23, 2008

(65) Prior Publication Data
US 2009/0024378 A1 Jan. 22, 2009

Related U.S. Application Data (60) Provisional application No. 60/945,899, filed on Jun. 22, 2007.

(51) Int. Cl.
*G06F 17/50* (2006.01)
(52) U.S. Cl. .............................. 703/13; 716/4
(58) Field of Classification Search .................... 703/13; 716/4, 5
See application file for complete search history.

(56) References Cited

U.S. PATENT DOCUMENTS

| 6,880,136 | B2 | 4/2005 | Huisman et al. | |
|---|---|---|---|---|
| 6,888,564 | B2 | 5/2005 | Caviedes et al. | |
| 7,539,893 | B1 | 5/2009 | Ferguson | |
| 2007/0098116 | A1* | 5/2007 | Kim et al. | 375/343 |
| 2007/0277134 | A1 | 11/2007 | Zhang et al. | |
| 2008/0005707 | A1 | 1/2008 | Papanikolaou et al. | |
| 2008/0046692 | A1 | 2/2008 | Michalak et al. | |

FOREIGN PATENT DOCUMENTS

EP 1583009 A1 10/2005

OTHER PUBLICATIONS

Dierickx et al., Propagating Variability from Technology to System Level, 2007.*
Weaver, Probability and Hypothesis Testing, 2005.*
Agarwal et al., Process variation in embedded memories: failure analysis and variation aware architecture, *IEEE Journal of Solid-State Circuits* (Sep. 2005), vol. 40 No. 9:1804-1814.
Agarwal et al., Statistical timing analysis using bounds and selective enumeration, *IEEE Trans. on CAD* (Sep. 2003), vol. 22 No. 9.

(Continued)

*Primary Examiner* — Paul Rodriguez
*Assistant Examiner* — Andre Pierre Louis
(74) *Attorney, Agent, or Firm* — Knobbe Martens Olson & Bear LLP (57) ABSTRACT

A method of determining the behavior of an electronic system comprising electronic components under variability is disclosed. In one aspect, the method comprises for at least one parameter of at least one of the electronic components, showing variability defining a range and a population of possible values within the range, each possible value having a probability of occurrence, thereby defining an input domain. The method further comprises selecting inputs randomly from the input domain, wherein the probability to sample (PTS) is obtained from the probability of occurrence (PTOIR). The method further comprises performing simulation to obtain the performance parameters of the electronic system, thereby defining an output domain sample. The method further comprises aggregating results of the individual computations into the parameter/variability of the electronic system and assigning a frequency of occurrence (FoO) to the resulting sample, the parameter variability and the frequency of occurrence defining the behavior.

11 Claims, 6 Drawing Sheets

OTHER PUBLICATIONS

Antreich et al., Circuit analysis and optimization driven by worst-case distances, *IEEE Trans. on CAD* (Jan. 1994), vol. 13, No. 1.
ARM The Architecture for the Digital World, http://www.arm.com/products/physical-ip/embedded-memory-ip/index.php, accessed Feb. 21, 2011.
Ashouei et al, Statistical Estimation of Correlated Leakage Power Variation and Its Application to Leakage—Aware Design, Proceedings of 19th International Conference on VLSI Design, Jan. 3-7, 2006, 7 pages.
Austin et al., Making typical silicon matter with razor, *IEEE Computer* (Mar. 2004) pp. 57-65.
Benini et al., System-level power optimization techniques and tools, *ACM Trans. on Design Automation for Embedded Systems*, vol. 5, Issue 2, Apr. 2000, pp. 288-293.
Blaauw et al., CAD tools for variation tolerance, *Design Automation Conference* (Jun. 2005), 766.
Borkar, Designing reliable systems from unreliable components: the challenges of transistor variability and degradation, *IEEE Micro* (Nov./Dec. 2005), vol. 25, No. 6, pp. 10-16.
Bratley et al., A Guide to Simulation, 1983, pp. 42-72, Springer-Verlag New York Inc., New York.
Chang et al., Statistical timing analysis considering spatial correlations using a single PERT-like traversal, *Intl. Conf. on Computer Aided Design* (Nov. 11-13, 2003), pp. 621-625.
Chen et al, Area Fill Synthesis for Uniform Layout Density, IEEE Transactions on Computer-Aided Design of Integrated Circuits and Systems, Oct. 2002, vol. 21, No. 10, pp. 1132-1147.
Clark et al., The Greatest of a Finite Set of Random Variables, Operations Research, Mar.-Apr. 1961, vol. 9, No. 2, pp. 145-162.
Dierickx et al., "VAM IF" Variability and Reliability Aware Modeling Information Format Definition and User Manual, Jul. 2007.
Genest et al., Everything you always wanted to know about copula modeling but were afraid to ask, *Journal of Hydrologic Engineering* (Mar. 21, 2006).
Grobman et al, Reticle Enhancement Technology: Implications and Challenges for Physical Design, 38th Conference on Design Automation, DAC Jun. 18-22, 2001, pp. 72-78, Las Vegas, Nevada.
Gupta et al, Manufacturing-Aware Physical Design, IEEE/ACM Int'l Conference on Computer-Aided Design, ICCAD Nov. 11-13, 2003, pp. 681-687, San Jose, California.
Gupta et al, Toward a Systematic-Variation Aware Timing Methodology, Design Automation Conference, Jun. 7-11, 2004, pp. 321-326, San Jose, California.
Gupta, et al, Toward Performance-Driven Reduction of the Cost of RET-Based Lithography Control, Proc. SPIE, Conference date: Feb. 27, 2003, Online publication date: Jul. 31, 2003, vol. 5043, No. 123.
Habitz, P., Chip Timing and Optimization using Statistical Analysis Methods, ASICs Timing Methodology, from Practical Aspects of Coping with Variability: An Electrical View, Tutorial at ACM/IEEE Design Automation Conf. Jul. 24-28, 2006.
Hong et al., On-line scheduling of hard real-time tasks on variable voltage processors, *Intl. Conf. on Computer Aided Design* (Nov. 1998), pp. 653-656, San Jose, CA.
International Technology Roadmap for Semiconductors, http://public.itrs.net, 2005.
Jacobs et al, Gate Sizing Using a Statistical Delay Model, Design Automation and Test in Europe Conference and Exhibition, Mar. 27-30, 2000.
Kim et al., TCAD-Based Statistical Analysis and Modeling of Gate Line-Edge Roughness Effect on Nanoscale MOS Transistor Performance and Scaling, IEEE Transactions on Semiconductor Manufacturing, May 2004, vol. 17, No. 2, pp. 192-200.
Lin, X.W., Design and Process Variability—the Source and Mechanisms, from Practical Aspects of Coping with Variability: An Electrical View, Tutorial at ACM/IEEE Design Automation Conf. Jul. 24-28, 2006.
Mani et al., A new statistical optimization algorithm for gate sizing, *Intl. Conf. on Computer Design* (Oct. 11-13, 2004), pp. 272-277.
Mani et al., An efficient algorithm for statistical minimization of total power under timing yield constraints, *Design Automation Conference* (Jun. 13-17, 2005), pp. 309-314, Anaheim, CA.

Montgomery, Applied statistics & probability for engineers, Chapter 5: Joint Probability Distributions, John Wiley & Sons, Jan. 1994.
Nikolic, B., Capturing Variability, from Practical Aspects of Coping with Variability: An Electrical View, Tutorial at ACM/IEEE Design Automation Conf. Jul. 24-28, 2006.
Nose et al. Vth-hopping scheme to reduce subthreshold leakage for low-power processors, *IEEE J. of Solid-State Circuits* (Mar. 2002), vol. 37 No. 3, pp. 413-419.
Okuma et al. Real-time task scheduling for a variable voltage processor, *Intl. Symposium on System Synthesis* (Nov. 1999), 24-29.
Papanikolaou et al., A system-level methodology for fully compensating process variability impact of memory organizations in periodic applications, *Intl. Conference on HW/SW Co-design and System Synthesis (CODES+ISSS)* (Sep. 19-21, 2005) New Jersey, USA.
Patel et al., Synthesis of partitioned shared memory architectures for energy-sufficient multi-processor SoC, Proceedings of the Conference on Design, Automation and Test in Europe, Feb. 16-20, 2004, pp. 700-701.
Pelgrom et al. Matching Properties of MOS Transistors, IEEE Journal of Solid-State Circuits, Oct. 1989, vol. 24, No. 5, pp. 1433-1440.
Rao et al, Parametric Yield Estimation Considering Leakage Variability, Annual ACM IEEE Design Automation Conference, Jun. 7-11, 2004, pp. 442-447, San Diego, California.
Riko, R., DFM View, Methodology Perspectives, Techniques for Stitching Together DFM Methods and Timing Optimization into a Usable Methodology, from Practical Aspects of Coping with Variability: An Electrical View, Tutorial at ACM/IEEE Design Automation Conf. Jul. 24-28, 2006.
Sinha et al., Advances in Computation of the Maximum of a Set of Random Variables, Proceedings of the 7th International Symposium on Quality Electronic Design, 2006, 6 pages.
Srivastava et al., Accurate and efficient gate-level parametric yield estimation considering correlated variations in leakage power and performance, *Design Automation Conference* (Jun. 13-17, 2005), pp. 535-540, Anaheim, CA.
Srivastava et al., Concurrent sizing, Vdd and Vth assignment for low power design, IEEE (Feb. 2004), 718-719.
Srivastava et al., Statistical optimization of leakage power considering process variations using dual-Vh and sizing, *Design Automation Conference* (Jun. 7-11, 2004), pp. 773-778, San Diego, CA.
Synopsys, http://www.synopsys.com/Tools/Pages/default.aspx, accessed Apr. 21, 2011.
Viswewariah, Death, taxes and failing chips, *Design Automation Conference* (Jun. 2-6, 2003), pp. 343-347, Anaheim, CA.
Visweswariah et al, First-Order Incremental Block-Based Statistical Timing Analysis, Design Automation Conference, Jun. 7-11, 2004, pp. 331-336.
Visweswariah, Statistical timing of digital integrated circuits, *Microprocessor Circuit Design Forum at ISSCC* (2004).
Wang et al., Systematic analysis of energy and delay impact of very deep submicron process variability effects in embedded SRAM modules, *Proc. 4th ACM/IEEE Design and Test in Europe Conf.* (Mar. 2005), Munich, Germany, pp. 914-919.
Wang et al., Variable tapered pareto buffer design and implementation techniques allowing run-time configuration for low power embedded SRAMs, *IEEE Trans. on VLSI* (Oct. 2005), 13(10):1127-1135.
Wettstein et al., Random Dopant Fluctuation Modelling with the Impedance Field Method, IEEE, 2003, pp. 91-94.
Yang et al., Advanced timing analysis based on post-OPC extraction of critical dimensions, *DAC* (Jun. 13-17, 2005), pp. 359-364, Anaheim, CA.
Zhao et al., New Generation of Predictive Technology Model for Sub-45 nm Early Design Exploration, IEEE Transactions on Electron Devices, Nov. 2006, vol. 53, No. 11, pp. 2816-2823.
European Search Report dated Oct. 22, 2007 in European Application 07075505.3.
Office Action dated Dec. 2, 2010 in U.S. Appl. No. 11/769,546.
Office Action dated Jul. 21, 2010 in U.S. Appl. No. 11/769,546.
Office Action dated Nov. 10, 2009 in U.S. Appl. No. 11/769,546.

* cited by examiner

Figure 1

| entry | ptoir | delay | static | dynamic |
|---|---|---|---|---|
| 1 | 1.697E-03 | 2.976E-09 | 5.098E-07 | 1.267E-09 |
| 2 | 5.340E-02 | 3.550E-09 | 5.622E-07 | 1.322E-09 |
| 3 | 5.510E-02 | 2.876E-09 | 4.842E-07 | 1.212E-09 |
| 4 | 1.419E-02 | 3.178E-09 | 5.350E-07 | 1.200E-09 |
| 5 | 8.651E-02 | 3.506E-09 | 5.498E-07 | 1.230E-09 |
| 6 | 2.317E-02 | 2.415E-09 | 4.220E-07 | 1.282E-09 |
| 7 | 1.029E-02 | 2.970E-09 | 4.943E-07 | 1.156E-09 |
| 8 | 3.293E-02 | 2.730E-09 | 4.865E-07 | 1.312E-09 |
| 9 | 8.554E-02 | 3.507E-09 | 5.710E-07 | 1.248E-09 |

SIMULATION METHOD FOR EFFICIENT CHARACTERIZATION OF ELECTRONIC SYSTEMS UNDER VARIABILITY EFFECTS

CROSS REFERENCE TO RELATED APPLICATIONS

This application claims priority under 35 U.S.C. §119(e) to U.S. provisional patent application 60/945,899 filed on Jun. 22, 2007, which application is hereby incorporated by reference in its entirety.

BACKGROUND OF THE INVENTION

1. Field of the Invention

The invention relates to method for simulating behavior of electronic systems under variability and deriving there from adaptations for the production process and/or measures to be taken within the electronic systems for guaranteeing proper performance irrespective of such variability. The method further relates to production processes capable of receiving and using information from the simulation method, electronic systems equipped with such performance guaranteeing methods, accepting and using information obtained with such simulation method.

2. Description of the Related Technology

Technology scaling into the deep sub-micron era is disrupting well-established design practices and flows. Process and material variability introduces functional problems and parametric uncertainty.

New tools enter the design flow to counter its impact, such as design for manufacturing (DFM), a collection of measures aiming to improve functional yield by correctly modeling and providing solutions for systematic manufacturing errors, and statistical static timing analysis (SSTA), and are used for the estimation of the impact of variability on parametric specifications, timing and leakage (see X.-W. Lin, B. Nikolic, P. Habitz, R. Radojcic, "Practical Aspects of Coping with Variability: An Electrical View", Tutorial at ACM/IEEE Design Automation Conf. 2006; Y. Chen, A. Kahng, G. Robins, A. Zelikovsky, "Area Fill Synthesis for Uniform Layout Synthesis", IEEE Trans. on CAD of Integrated Circuits and Systems, vol. 21, no. 10, pp. 1132-1147, 2002; P. Gupta, F-L. Heng, "Toward a systematic-variation aware timing methodology", Proc. ACM/IEEE Design Automation Conference, pp. 321-326, 2004; L. Stok, J. Koehl, "Structured CAD: technology closure for modern ASICs", Tutorial at IEEE Design Automation & Test in Europe (DATE), 2004; E. Jacobs, M. Berkelaar, "Gate sizing using a statistical delay model", Proc. IEEE Design Automation & Test in Europe (DATE), pp. 283-290, 2000; C. Visweswariah, K. Ranvindran, K. Kalafala, S. G. Walker, S. Narayan, "First-Order Incremental Block-Based Statistical Timing Analysis", Proc. ACM/IEEE Design Automation Conf., pp. 331-336, 2004.)

There exists not a sole type of variability. Variability exhibits geometrical or spatial correlation: it may be local (as what is commonly known as "mismatch") or global ("die to die", "across wafer", "wafer to wafer"), random e.g. due to Random Dopant Fluctuations, versus systematic, or non-reproducible versus reproducible.

Moreover, technology, device and circuit variability parameters exhibit complex correlations, which are not easily represented in a generic fashion. Variation of underlying technology parameters may affect devices and circuits in a correlated fashion.

State of the Art EDA tools that handle variability are in the domains of DFM and SSTA. The advent of sub-wavelength lithography has provoked inaccuracies and shape perturbations that influence the properties of the printed devices. Modeling approaches and solution techniques for these problems have been developed. This broad class of tools is known as Design-For-Manufacturing (DFM). It aims to provide models of systematic effects in geometrical imperfections, and solutions that are applied during mask generation and manufacturing (see W. Grobman, R. Tian, E. Demircan, R. Wang, C. Yuan, M. Thompson, "Reticle Enhancement Technology: Implications and Challenges for Physical Design", ACM/IEEE Proc. Design Automation Conf., pp. 72-78, 2001; [ ] D. Sylvester, P. Gupta, A. B. Kahng, J. Yang, "Toward performance-driven reduction of the cost of RET-based lithography control", Proc. SPIE, pp. 123-133, 2003.) Examples are Optical Proximity Correction, CMP compensation. DFM tackles predictable, reproducible ("systematic") effects and impacts functional yield. In recent years, DFM approaches that compensate for the impact of physical distortions on the parametric properties of the device have emerged. They are called electrical DFM. A comprehensive overview of DFM is presented in P. Gupta, A. B. Kahng, "Manufacturing-Aware Physical Design", Proc. IEEE/ACM Intl. Conference on Computer-Aided Design, pp. 681-687, 2003.

Scaling further into the deep-deep sub micron regime has aggravated problems due to "random variability". RDF (random dopant fluctuations) and LER (line edge roughness) are representative problems of this class. They are stochastic effects impacting the performance of the transistors.

SSTA (statistical static timing analysis) handles random variability by modeling statistically the impact of random effects on the timing of the circuit. SSTA emerged as a response to the difficulty to achieve timing closure under random variability. It is also used to obtain better estimates for required design margins and guard-bands. Recently commercial SSTA tools also incorporate a statistical estimation of the leakage power consumption of the chip under variability (see R. Rao, A. Devgan, D. Blaauw, D. Sylvester, "Parametric yield estimation considering leakage Variability", Proc. ACM/IEEE Design Automation Conference, pp. 442-447, 2004; M. Ashouei, A. Chatterjee, A. Singh, V. De, T. Mak, "Statistical estimation of correlated leakage power variation and its application to leakage-aware design", Proc. Intl. Conf. on VLSI Design, 2006.) This provides the designer a partial view on the power consumption of the chip.

Various DFM techniques have found widespread use, SSTA is still gaining acceptance. One observes that further acceptance of today's variability modeling techniques is hampered by leaving inaccuracy gaps, which preclude the techniques from reaching a comprehensive predictive capability. Challenges are A systematic treatment of local versus global, systematic (reproducible) versus random (stochastic).

Models need more detail than normal (Gaussian) distributions or linear sensitivities to small signals perturbation can offer. This is more true as perturbations become "large signal", and distributions can have uncommon shapes.

maintaining correlations of common underlying physical variability sources.

The need to maintain a correlated view between speed performance and static/dynamic power, hence modeling the correlated variability of dynamic energy, static power and speed performance.

SUMMARY OF CERTAIN INVENTIVE ASPECTS

Certain inventive aspects relate to simulation methods for determining behavior of electronic systems which are both accurate and efficient, meaning capable of giving reliable results without spending too much computation power, the methods being designed particularly by recognizing the particularities of variability (various types, correlated) in electronic systems and/or by incorporating the typical layered and/or hierarchical structure of such systems.

In a first aspect of the invention an automated simulation method, to be executed on a computer environment, for determining the behavior of electronic systems is provided, which includes the particularities of electronic system variability, in particular the fact simulation methods solely based on random selection of electronic system component variables in a Monte-Carlo based manner, will fail to include outlier values, which occur rarely but have a tremendous effect on the end result of the simulation.

In a second aspect of the invention an automated simulation method, to be executed on a computer environment, for determining the behavior of electronic systems is provided, which takes advantage of the typical layer and/or hierarchical structure of such systems, by propagating properties obtained for one level of the layer or hierarchy towards another level in an efficient way.

In a third aspect of the invention an automated simulation method, to be executed on a computer environment, for determining the behavior of electronic systems is provided, which recognizing the non-linear relations between the several layers, and selects in an automated way, how to combine the first and second aspect of the invention to find the final behavior again in an accurate but efficient way.

In one aspect, a method for propagating variability up in "abstraction level" is disclosed. The method comprises defining a domain and population of possible values of at least one variability parameter each possible value of the at least one variability parameter having a probability of occurrence. The method further comprises selecting inputs randomly from the input domain, whereby the probability to sample (PTS) is obtained from the probability of occurrence (PTOIR) as $PTS_{inputdomain}=(PTOIR_{inputdomain})^{(1-gamma)}$, where gamma is a specific non-zero number in the range of about −1 to +2, preferable about 0 to 1. The method further comprises performing a simulation to obtain the performance parameters of the output domain sample. The method further comprises aggregating the results of the individual computations into the parameter/variability. The method further comprises assigning a frequency of occurrence FoO to the resulting sample being $FoO_{outputdomain}=(PTOIR_{inputdomain})^{(gamma)}$.

In another aspect, the method may further comprises condensing the number of possible values of at least one variability parameter by clustering a number of possible values and using a domain of these clustered values for randomly selecting inputs.

In another aspect, a population in the method is reduced in size by combining (binning or clustering) nearby elements of the population into one single element with a average value of the constituting elements.

In another aspect, the method may further comprise repeating the method of any of the previous claims over a plurality of abstraction levels.

In another aspect, the exponent gamma [used at an abstraction level] is the same for all components inside the same EMC process.

In another aspect, the output domain parameters and/or input domain parameters, and/or pointers to output domain or input domain parameters, for each item of the population, and optionally for items of a different populations are correlated with the item, are put in a table or plurality of tables, whereby items in the same line of the effective very table are correlated.

In another aspect, the method may further comprise using a plurality of response surface models for determining results relative variability etc for those inputs not selected for performing a (deterministic computation=) simulation.

In another aspect, the response surface model is a piecewise linear model.

DETAILED DESCRIPTION OF CERTAIN ILLUSTRATIVE EMBODIMENTS

A method capable of handling variability over the whole manufacturing and design flow is proposed. The goal is propagating "almost any" variability distribution over all levels of abstraction that occur in a typical CMOS SoC design flow. The methodology builds on top of existing signoff and simulations flows, and "adds" or "enables" variability.

In order to reach that goal, we adhere to the one or more of the following, either separately or in combination:

any variability distribution may be represented. We do this by casting these systematically to a numerical representation (called in one embodiment Exponent Monte Carlo, EMC), superseding analytical representations.

a specific treatment and representation for different "types" of variability: random versus systematic, local versus global variabilities.

correlation between parameters of the same or different objects (device, circuit parts) is systematically represented and preserved.

propagation of variability may happen through "Exponent" Monte Carlo sampling, which needs a fairly low number of samples still yielding sufficient accuracy in estimating the frequency of outliers or of distribution tails solely and/or in combination with Response Surface Method techniques.

Figure 1:
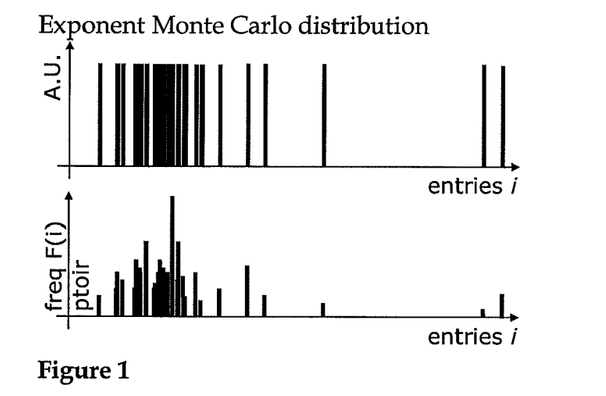
FIG. 1 shows a Point-wise described distributions in one dimension. (a) Top: the result distribution of a "classic" Monte Carlo experiment: the list of entries equals the list of population members. (b) Bottom: "Exponent" Monte Carlo distribution. Members ("entries") of the population have individual frequencies or "probabilities to occur in reality" (PTOIR).

In a first aspect of the invention the use of a technique for performing computations which needs a fairly low number of samples still yielding sufficient accuracy in estimating the frequency of outliers or of distribution tails (See FIG. 1).

In an embodiment thereof EMC is proposed as a distribution which a way to represent any uni- or multi-dimensional distribution, be it coming from measurements or from analytical expressions. In our framework we represent all "objects" with all their variability parameters in one large EMC table (See FIG. 2).

Figure 2:
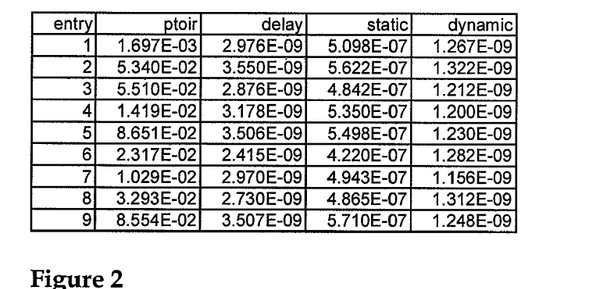
FIG. 2 is a diagram illustrating an example of a EMC set for a digital block. Three correlated object parameters are listed versus their frequency or "probability to occur in reality". One can easily see that multiple such table can co-exists for different populations (e.g. a table for NANDs, a table for NORs, for a digital block etc.), which have the same number of rows in the table and for which the items on the same row number are correlated. This correlation can exist over abstraction level boundaries. E.g. the full system table might be correlated with the nMOSFET table.

E.g. such object can be a nMOSFET, in the simplest case with parameters Vth and Beta, or a NAND gate with parameters static power, dynamic energy, and delays for certain load conditions and input conditions (See FIG. 2). (Exponent) Monte Carlo experiments sampling such objects will automatically sample correlated parameters. Additional to that, correlation between objects—i.e. nMOSFETs are correlated to pMOSFETs, NAND delay is correlated to NOR delay, etc. as they share underlying common technology variability—is enabled by creating the EMC tables for each object concurrently, and implying correlation between the row indexes of the EMC table for each object.

Figure 3:
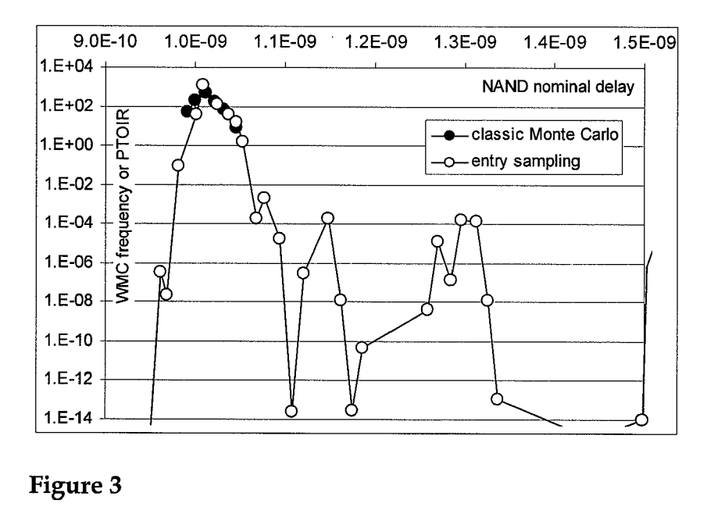
FIG. 3 is a diagram illustrating "Probability to occur in reality" (not normalized) versus gate delay, for samples of a 1000 sample NAND population. Populations were generated in two ways (a) classic Monte Carlo (which is as EMC with γ=0) (b) Entry Sampling (which is a EMC with γ=1).

Apart from its representation EMC provides also a sampling strategy for Monte Carlo experiments. In the FIG. 3 we show the results of a simple sampling experiment. We create populations of NANDs from 4 randomly sampled MOSFETs. For each NAND, its delay (and energy) is calculated or simulated.

Classic Monte Carlo and Entry Sampling are two singular cases of a more generic "Exponent" Monte Carlo sampling method.

Classic Monte Carlo sampling can be described as following two-step process:

(a) In a EMC distribution such as in FIG. 1, pick an lower object with entry i using a random number that has a probability to be sampled proportional to F(i) or PTOIR(i).

(b) For the lower object corresponding to that entry to build a random object at higher level each such higher object has equal PTOIR The "Entry Sampling strategy" says:

(a) pick the entry with a random number that gives each entry equal probability.

(b) Assign to the object corresponding to that entry a "probability to occur" at higher level that is proportional to F(i).

Monte Carlo fails in tracing distributions tails and outliers. Entry sampling over-emphasizes them.

Now Observe that the product of the probability of the two steps is constant and proportional to PTOIR(i). This allows us to define the Exponent Monte Carlo sampling strategy also as a two-step process that is a generic representation of the above processes:

(a) pick the entry with a random number that gives each entry a probability to be picked $F(i)^{(1-\gamma)}$.

(b) assign to the resulting object a probability to occur of $F(i)^\gamma$.

The product of both steps is again F(i).

Figure 4:
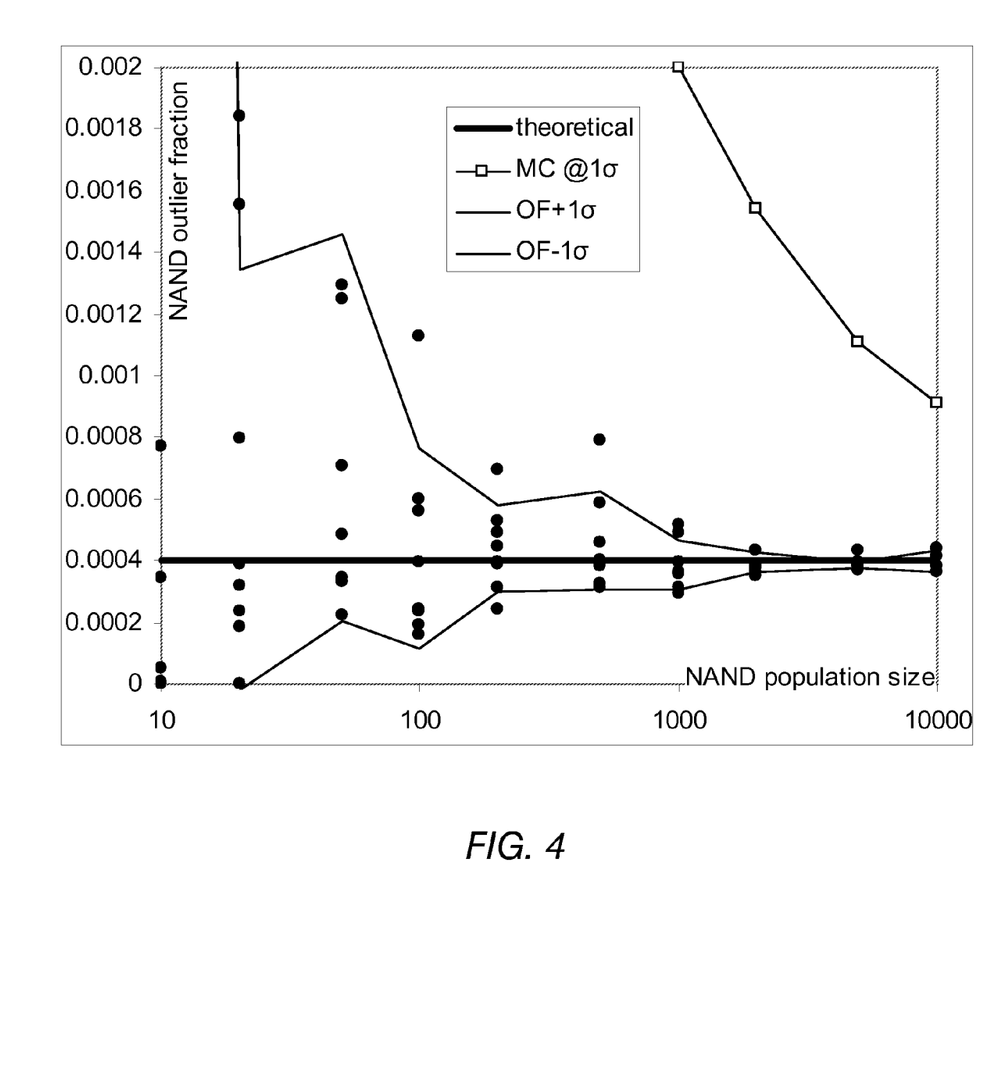
FIG. 4 is a diagram illustrating accuracy (average and overall +1σ and −1σ) of the estimation of the outlier fraction (OF) of NANDs versus the amount of samples in the population. In this experiment, γ is 0.6. The theoretical outlier fraction is 0.04% (thick line). For comparison, the +1σ accuracy line when classic Monte Carlo (MC@1σ) is used is shown too.

By choosing the optimum value for $\gamma$, one can greatly improve the speed by which the sampled population converges to its asymptotic distribution. EMC is a particular "variance reduction technique", as in P. Bratley, B. Fox, L. Schrage, "A guide to simulation", Springer-Verlag New-York 1983. FIG. 4 illustrates the efficiency of EMC to simulate distributions tails and outliers. In this experiment, NANDs are composed from MOSFETs that have 1/1e4 outliers. We ran a large number of EMC experiments to estimate the fraction of NANDs that contain outlier MOSFETs.

The outlier fraction estimates requires about 100× less samples with EMC than with classic Monte Carlo. In this case, we are able to estimate the number of outliers with an accuracy of 1 sigma, using a 100 sample EMC population with a properly chosen $\gamma$. This improvement is consistent with other observations; the factor depends on the actual outlier "rareness", the $\gamma$ used, the number of components in the system (as MOSFETs in a NAND), and other peculiarities of the circuit.

Figure 5:
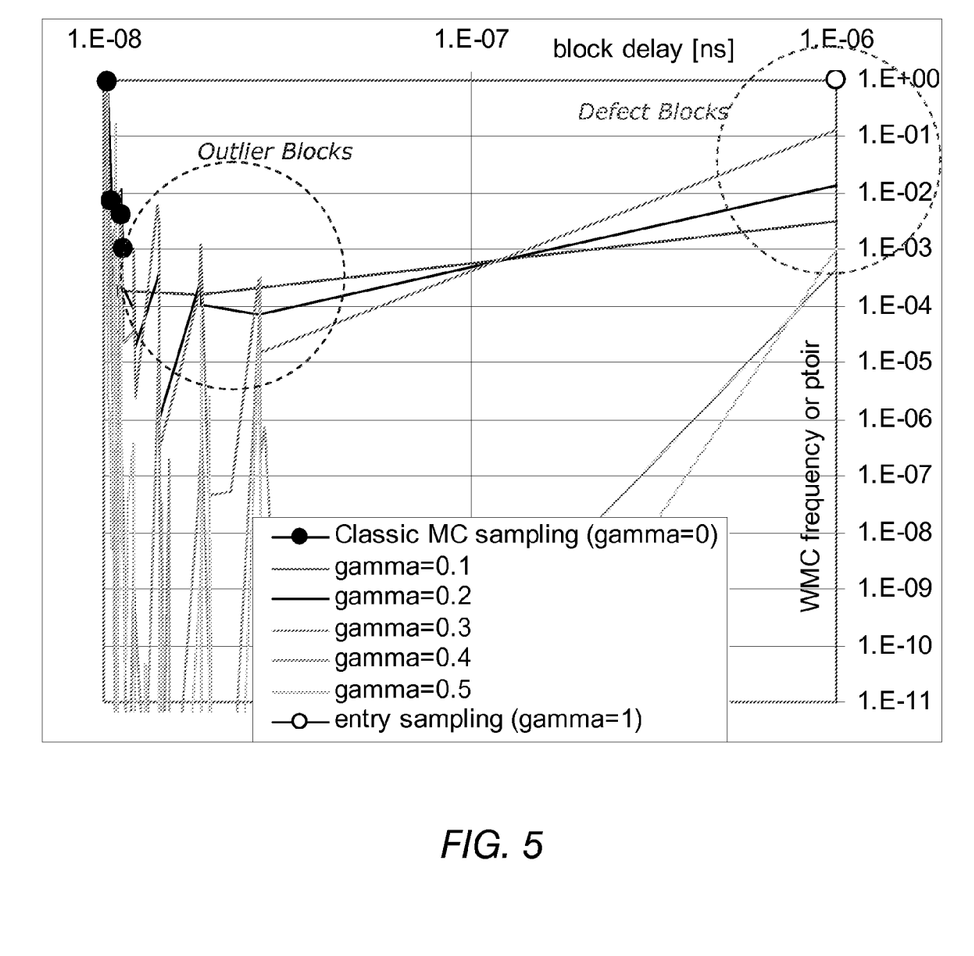
FIG. 5 is a diagram illustrating exponent Monte Carlo experiments creating 100 random digital blocks. Each block contains 100 NANDs as from FIG. 3. X-axis: block delay, Y-axis: probability to occur in reality.
Figure 6:
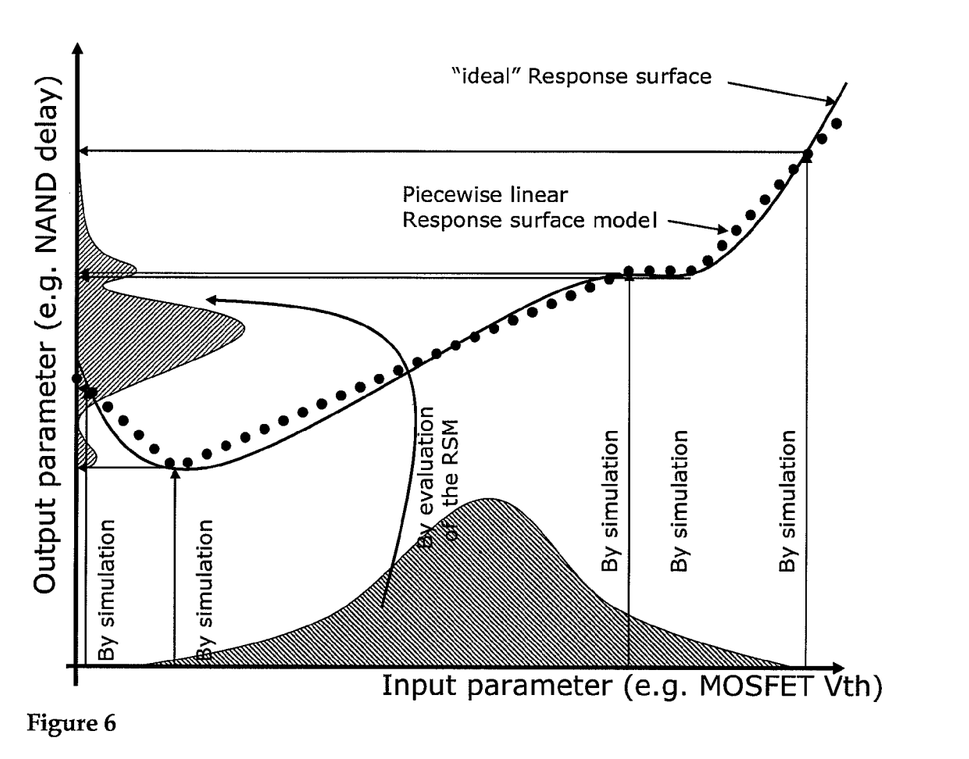
FIG. 6 is a diagram illustrating a piece wise linear RSM for one dimensional input and output domains. Only the points that define the line pieces are actually simulated. All other points are obtained by evaluating the RSM. Hatched areas are superimposed distributions (PDFs) of the output and output domain parameters, as example.
Figure 7:
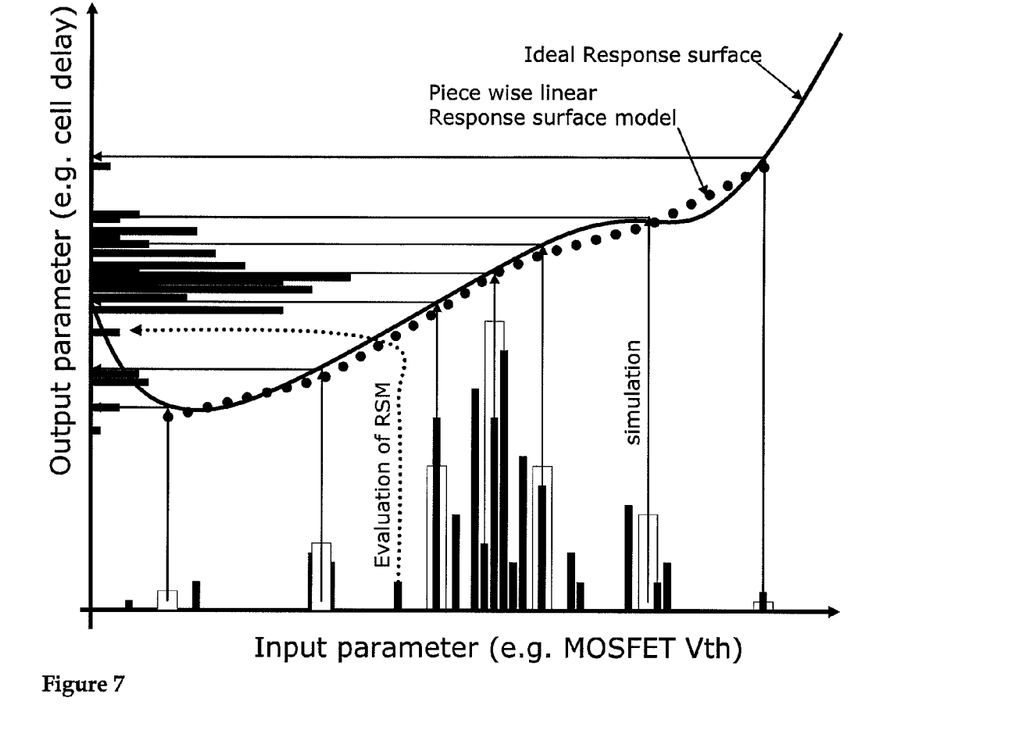
FIG. 7 is a diagram illustrating a piece wise linear RSM for one dimensional input and output domains. Only the points that define the line pieces are actually simulated. All other points are obtained by evaluating the RSM. Superimposed on x (input domain) and y (output domain) axes are the distributions represented in the "EMC" style. From the input domain population, the white members are simulated, resulting in the point-wise RSM, the black members are evaluated using RSM.

FIG. 5 represents a set of experiments creating larger random digital blocks from these random NANDs. Observe classic Monte Carlo and Entry Sampling fail in representing the full output distribution with main distributions, outliers and defect items. Good detail for the whole distribution is obtained when using a $\gamma$ between 0.1 and 0.4.

First let us introduce the following definitions for certain concepts that will be mentioned below.

"Abstraction levels" in a normal integrated circuit design and manufacturing flow are, ranked from "low" to "high":

1. technology level, where variability (variability parameters) is expressed in concentration variations and small scale geometrical variations.
2. device level (transistor level, passive component level, interconnect level, compact model level), where variability (variability parameters) is the randomness of electrical parameters such as threshold voltage, resistance, capacitance etc
3. cell level (standard cell level, analog circuit level), where variability (variability parameters) is expressed as random variations of delay, speed, power, energy of the cell.
4. digital block level (which consists of a possibly hierarchical assembly of smaller blocks, up to full chip or integrated circuit level), where variability typically is expressed speed, power, energy, execution time. There are possibly several sub-abstraction levels inside this level, as digital blocks can be hierarchically organized.
5. system level, which is the digital block (or full integrated circuit, or mixed circuit blocks or ICs), PLUS the application and or software running on the digital block.

Variability (variability parameters) is now expressed in the ability to execute the task and is then synonym to yield as a function of speed, power etc.

input domain, output domain, population: When raising the abstraction level up in the integrated circuit design and manufacturing flow, the "input domain" is the collection of possible values of the variability parameters of the lower abstraction level. The output domain is the collection of +possible values of the higher, resulting, abstraction level. e.g. in a Monte-Carlo or Monte-Carlo-like process having as output (as result) (a population of) cells, such as NAND-gate standard cells,
  using as input randomly picked MOSFETs, then
  the input samples are the MOSFETs. They are samples from the input population.
  The input abstraction level is the device level or compact model level, the input domain are the values of Vth (threshold voltage) of the picked MOSFETs. (there may be likely be more parameters in the input domain, theoretically all model parameters of the MOSFET could be input domain, but we simplify for the cause of this document)
  the output samples are NAND gates, forming together the output population. The output abstraction level is the cell level (or standard cell level), the output domain are the values of delay, power and energy of the created NAND gates. (there may be likely be more parameters in the output domain, in fact, all variable numbers in the so-called LIBERTY format representation of a standard cell are output domain parameters.

probability of occurrence, PTOIR and frequency of occurrence (FoO): For a given (input/output) population, each element of that population has a "probability to occur". This is used by us as synonym to "probability to occur in reality" (PTOIR). This is also synonym to "frequency" or "frequency of occurrence", but we avoid using the word frequency as it is an often used variability parameter, which would be confusing.

Sometimes one uses the difference between probability and frequency, in the sense that the sum of all probabilities of a population is 1, whereas the frequency of an individual element is 1 itself and the sum of all frequencies is thus the population size. Yet in this document, it must be clear that one can always normalize frequencies to probabilities, and work with these. In fact, unlike in classic Monte Carlo processes, we never assume that elements of a population must have integer number frequencies.

Probability of occurrence and PTOIR applies to individual members of the population or domain. Yet, they can apply to groups of elements of the population or regions of the domain. So can they apply to segments of an histogram, or can they be applied to a new population that is obtained by "binning" (combining multiple close by elements in one) an old population. It suffices to consider groups of elements in a population as an element themselves.

In a classic Monte Carlo process, the probability to pick (sample) an element from an input population is equal to its PTOIR or probability of occurrence. In one embodiment (Exponent Monte Carlo, EMC), we define a parameterized power law using the gamma ($\gamma$) exponent, where the probability to sample (PTS) relates to the PTOIR as:

$$PTS_{inputdomain} = (PTOIR_{inputdomain})^{(1-\gamma)}$$

$$PTS_{inputdomain} = PTS_{classicmontecarlo} \cdot (PTOIR_{inputdomain})^{(-\gamma)}$$

Where we thus enhanced the PTS with a factor:

$$PTS_{enhancement} = (PTOIR_{inputdomain})^{(-\gamma)}$$

And, in a classic Monte Carlo Process, the frequency of occurrence of the resulting element in the output domain is 1 (its PTOIR being frequency_of occurrence/population_size). In one embodiment ("Exponent" Monte Carlo), the gamma "exponent" enters as:

$$FoO_{outputdomain} = (PTOIR_{inputdomain})^{(\gamma)}$$

(understood that in a later step, FoO is normalized to PTIOR) Yet its probability for that particular sample to be in the population has been enhanced by $$PTS_{enhancement} = (PTOIR_{inputdomain})^{(-\gamma)}$$

In certain embodiments, the product to the $PTS_{enhancement}$ and the $FoO_{outputdomain}$ is for any value of gamma and for the classic Monte Carlo equal to 1. In other words, $PTS_{enhancement}$ and $FoO_{outputdomain}$ balance each other, hence no divergence from reality occurs, so the final result is accurate.

Classic Monte Carlo is a special case of EMC, where gamma is equal to 0.

The true value is of the above relation is that, when a very large number of samples is used to build an output domain population is constructed from an input population, that the shape of the resulting distribution (being the collection of normalized values $FoO_{outputdomain}$ [integrated over any region of the output domain]), on the average, is not dependent on gamma. Hence, EMC is a valid replacement of classic MC. The difference however, is that EMC may converge must faster to the asymptotic result depending on the value chosen for gamma, as it will provide data on tails and outliers of the distribution faster, i.e. using less samples, requiring thus less CPU time for simulations.

Experiments teach us that relevant values for gamma are in the range 0 to 1, or slightly outside, whereby value 0 corresponds to the classic Monte Carlo. We see that the gain in CPU time can amount to factors 10, 100 or more, depending on the actual case.

It goes without saying that, when an output element is composed of multiple input samples, the overall output PTOIR will become the product of the individual output PTOIRs.

One could formulate the method as a method to create an output population of new_items by randomly sampling per such new_item n (n>=1) old_items of an input population, whereby the probability to sample and old_item is a function of the probability_to_exist_in_reality=PTOIR (or FoO) of the old item, and the new PTOIR (or frequency of occurrence FoO) of the new_item is a product of a complementary function of the PTOIRs of the n old_items.

A method to create an output population of new_items by randomly sampling old_items of an input population, whereby the probability to sample and old_item is a function of the probability_to_exist_in_reality=PTOIR (or FoO) of the old item, and the new PTOIR (or frequency of occurrence FoO) of the new_item is a complementary function of the PTOIRs of the n old_items.

Now lets focus on a second aspect of the invention.

One can consider the result of a simulation (as the one used to raise an "abstraction level") as a operation having an input (the input domain parameters (and others)), and an output (the output domain parameters (and others)).

E.g. take the case of an EMC experiment, creating a populations of NANDs, where by each NAND is composed of 4 randomly sampled MOSFETs, the where one is interested in is the variability of the NANDs being derived from the variability of the MOSFETs. The MOSFET variability can be expressed as (e.g., simplified, still realistic case) its Vth and beta; the input domain parameters are thus 8 in number and are the Vth and beta of each of the 4 transistors. The output information or what we want to obtain from the EMC experiment are (e.g., simplified but relevant) the delay and energy of the population of NANDS. The output domain parameters are thus 2 in number, being delay and energy of the NAND. For each individual NAND being considered in the population, its output parameters are obtained by simulation (using analog simulation software such as Spice) using as input [amongst other things which are constant and not variable, under which the Spice netlist of the NAND, the MOSFET compact models etc.] the Vth and beta of the 4 particular transistors used. We can say that this simulation is a "function (of the input parameters) yielding output parameters". A function is also called "response". The multidimensional function (of input parameters) yielding output parameters is called as multidimensional "response surface". Evaluation of the function (=of the simulation) is nothing else but finding the position of the response surface in the output domain dimension (axes), given the input domain values on the input domain axes. The "simulator" itself is thus a software realization of the response surface. Now the issue is that analog simulation (in fact any simulation in general) is "expensive" in terms of CPU time, i.e. one point of the response surface requires thousands or millions of operations of a CPU to evaluate. We could save a lot of simulation time/CPU time, if we had a simpler, CPU friendly, "model" of the response surface, hence the name "response surface model" (RSM).

A response surface model, in order to have usability, should be a good approximation of its response surface. The simplest, and in fact most used response surface models are linear response surface, being in fact multidimensional planes in the input+output domain. Such approach is sometimes also called the "linear sensitivity method". Most state of the art tools in electronic modeling use linear sensitivities if any. The advantage of the linear sensitivity is that it is a very simple linear analytic function, so that evaluation of the response surface model involves just a few CPU operations.

Linear sensitivities are useful for evaluation of variability when the variability is small, so that a linear approximation around an average point is sufficiently correct. Unfortunately, do to scaling, and for certain degradation and failure effects, the response surface is strongly non linear so that linear surface models or linear responses are imperfect.

Some groups/companies explored extending the linear response methods to polynomial (quadratic etc) models. Yet, polynomials cannot adequately approximate arbitrary functions as are the responses of typical electrons circuits. Especially discontinuous behavior, as one sees in case of a failure (which is due to variability), cannot be handled. In general, this shortcoming applies to all RSM methods where one tries to fit the simulation date to continuous smooth analytical functions. Nature is not smooth!

Our approach is to use RSM multiple times hence a piece wise approximations, for instance piece-wise linear approximations of the response surface. In one dimension this is easy to imaging and to draw; the piece wise linear RMS is defined by a list of points that are interconnected by the line pieces. In multiple dimension, one can not make a nice drawing, yet one can think of the RSM as a collection of multiple smaller piece-wise multidimensional planes, each being defined by a list of points in that multidimensional space.

The second aspect of invention is that these points in multidimensional space defining the RSM, are nothing else than a subset of the points in input and output domain of the EMC experiment.

There is even the extreme case, namely where all points in the EMC experiment are used in the RSM, In that case this point-wise RSM method and the EMC method are mathematically the same, namely:

In the EMC case, for every item being created in the EMC process, that item is simulated and the results are its output domain parameters.

In the RSM case, we want to define the RSM as a collection of point, in between one will later [if at all, as there are not others] interpolate other values, these points being both input domain parameter and output domain parameters, the output domain being obtained from the input domain by simulation.

As we can make the RSM from a variable size subset of the EMC population, we have thus a method where by one can at will chose to uses few or many simulations, thus, continuously trade off accuracy versus simulations time. The one can thus revert always to the brute force (high CPU)/high accuracy case if one wants to check the validity of the actual subset, or if one is not sure about something, or one is gaining confidence. This continuous trade-off between accuracy and CPU time is not possible with many other methods. E.g. a linear response mode or linear sensitivity is fast, but it is not easy or possible to increase its accuracy by giving more CPU. Its accuracy is inherently limited and difficult to qualify in operation (meaning, for the person using it in a tool, he has no easy clue if the results are valid).

Several aspect of the point-wise RSM needs further elaboration 1. how to select those point from the input domain to be used to create the RSM. And how to use also information of the output domain (after simulation) to optimize that choice.
2. how to evaluate the other point of the input domain, once the RSM is set up.

Selection of point of the input domain population to serve in the RSM.

Figure 8:
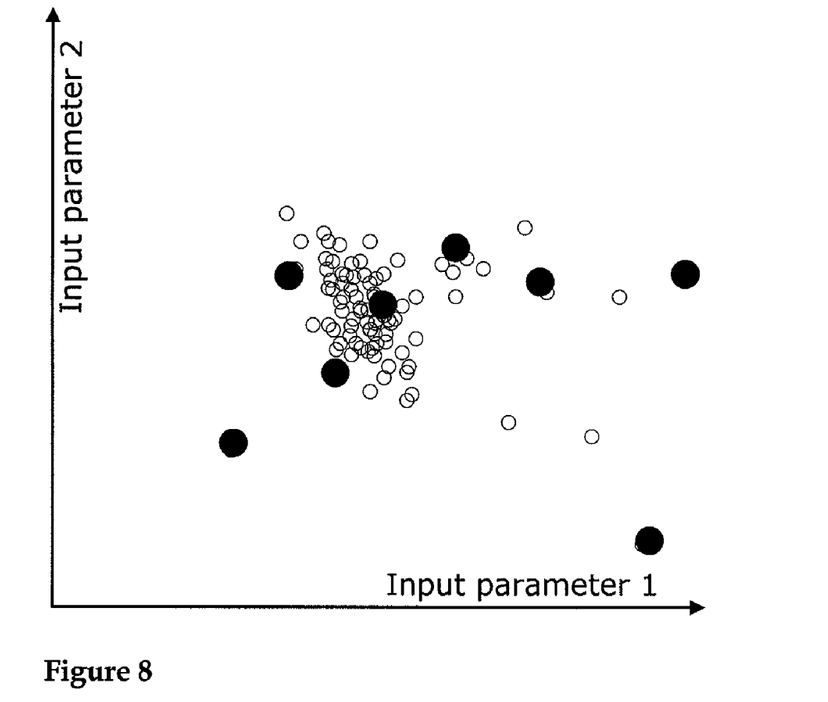
FIG. 8 is a diagram illustrating reduction of the number input domain points. Original populations are the small open circles. Points that are close together are combined in one by clustering (take one and discard the rest) or binning (make some weighted average). The resulting populations are the larger black circles.

Many strategies can be envisaged, with no preference. We here a summarize a few:

one chose at least the point that is the barycentrum of the input population, and in every dimension (or for every independent parameter) a point at a certain distance from the center, say at 1 sigma. Note that this corresponds closely to the "linear response" or linear RSM method, as tow point on a axis leave no other option than linear interpolation/extrapolation as the above, choosing more that two point in any axis, and performing the RSM as a polynomial interpolation/extrapolation.

as the above, but first performing a transforming on the input axes, so as to obtain a new set of input axes, which are better alighted to response surface, so that each of the new axes is an (more or less) orthogonal axis for the response (simulation). This corresponds to the so called "principal axes component" methods.

one can bluntly in multiple dimensions sample the input domain grid one can do that, after first discarding the zone in the input domain where there actually are not population members one can use knowledge of the simulator properties to define where one needs the points or the most points one can randomly pick point in the input domain.

one can use the simulation results of points already selected for the RSM, and decide on the value and/or non-linearity in those points if more points are required in that part of the input domain.

one can use the actual population of the input domain as points, or, start from the actual population and decimate it.

this decimation can be based on knowledge on the simulator or the physical phenomena or underlying principles of the circuit or devices this decimation can be based on clustering or binning of the input domain points (figure UUU), namely, points that are close together (distance according to some metric, which we do not go in further detail here are many metrics can be envisaged), are combined in one point. That decimation can be light or severe. [Up to the point that we reduce the population to 1 (which is singular as then the response is just flat or nil), 2 (meaning that the response is a multidimensional line defied by two point, which may be of limited use), or a few.

How to evaluate the other point of the input domain, once the RSM is set up:

For a on-dimensional input domain this is straightforward. The RSM is a piece-wise linear interpolation (at the extremities extrapolation).

It must no be linear interpolation, think also of bi-cubic or spline interpolation, and other.

in multiple dimensions, on can envisage to treat each input domain dimensions independently as the simple piecewise linear interpolation case. This will work, but has a potential flaw in it, that correlation in multiple dimensions is disregarded.

an alternative is to first select those point of the RSM that are closest to the point needing evaluation by the RSM ("closest" in some metric, which we will not discuss further as many possibilities exists, such as relative distance, Euclidean distance, Mahalanobis distance etc.), and then suing these point to define a local multidimensional plane that can easily be evaluated for the point needing evaluation, again in a linear or non-linear interpolation fashion.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of determining the behavior of an electronic system comprising electronic components under variability, the method comprising:
   (1) for at least one parameter of at least one of the electronic components, showing variability defining a range and a population of possible values within the range, each possible value having a probability of occurrence, thereby defining an input domain;
   (2) selecting inputs randomly from the input domain, wherein a probability to sample (PTS) is obtained from a probability of occurrence (PTOIR) as $PTS_{inputdomain} = (PTOIR_{inputdomain})^{(1-gamma)}$, wherein gamma is a specific non-zero number in the range of about −1 to +2;
   (3) performing a simulation to obtain performance parameters of the electronic system, thereby defining an output domain sample; and
   (4) aggregating results of individual computations into a parameter/variability of the electronic system and assigning a frequency of occurrence FoO to the resulting sample being $FoO_{outputdomain} = (PTOIR_{inputdomain})^{(gamma)}$, the parameter/variability and the frequency of occurrence defining the behavior,
   wherein the method further comprises condensing a number of possible values of at least one variability parameter by clustering the number of possible values and using a domain of these clustered values for randomly selecting inputs.

2. The methods according to claim 1, wherein the population of possible values is reduced in size by combining nearby possible values into one single possible value with an average value of the constituting possible values.

3. The method according to claim 2, wherein combining nearby possible values comprises binning or clustering nearby possible values.

4. The method according to claim 1, further comprising repeating the method of claim 1 over a plurality of abstraction levels.

5. The method according to claim 1, wherein the exponent gamma is the same for all the electronic components inside the electronic system.

6. The method according to claim 1, wherein the output domain parameters, and/or input domain parameters, and/or pointers to output domain or input domain parameters, for each item of the population, are put in one or more tables, wherein items in the same line of the table are correlated.

7. The method according to claim 1, further comprising using a plurality of response surface models for determining results for those inputs not selected for performing a simulation in accordance with claim 1.

8. The method according to claim 7, wherein the response surface model is a piece-wise linear model.

9. The method according to claim 1, wherein the gamma is a specific non-zero number in the range of about 0 to 1.

10. The method according to claim 1, wherein the method is executed on a computer environment.

11. A non-transitory computer-readable medium having stored therein instructions which, when executed by a computer, perform a method of determining the behavior of an electronic system comprising electronic components under variability, the method comprising:
   (1) for at least one parameter of at least one of the electronic components, showing variability defining a range and a population of possible values within the range, each possible value having a probability of occurrence, thereby defining an input domain;
   (2) selecting inputs randomly from the input domain, wherein a probability to sample (PTS) is obtained from a probability of occurrence (PTOIR) as $PTS_{inputdomain} = (PTOIR_{inputdomain})^{(1-gamma)}$, wherein gamma is a specific non-zero number in the range of about −1 to +2;
   (3) performing a simulation to obtain performance parameters of the electronic system, thereby defining an output domain sample; and
   (4) aggregating results of individual computations into a parameter/variability of the electronic system and assigning a frequency of occurrence FoO to the resulting sample being $FoO_{outputdomain} = (PTOIR_{inputdomain})^{(gamma)}$, the parameter/variability and the frequency of occurrence defining the behavior,
   wherein the method further comprises condensing a number of possible values of at least one variability parameter by clustering the number of possible values and using a domain of these clustered values for randomly selecting inputs.

* * * * *